United States Patent [19]

Letoffe et al.

[11] Patent Number: 4,797,462

[45] Date of Patent: Jan. 10, 1989

[54] ORGANOPOLYSILOXANES CONTAINING CURE ACCELERATORS

[75] Inventors: Michel Letoffe, Sainte Fay Les Lyon; Georges Barrandon, Mornant, both of France

[73] Assignee: Rhone-Poulenc Chimie, Courbevoie, France

[21] Appl. No.: 95,407

[22] Filed: Sep. 11, 1987

[30] Foreign Application Priority Data

Sep. 11, 1986 [FR] France .................... 86 12893

[51] Int. Cl.$^4$ ............................. C08G 77/06
[52] U.S. Cl. ............................. 528/12; 524/267; 524/588; 524/860; 528/14; 528/34; 528/41; 528/901
[58] Field of Search .............. 528/14, 34, 41, 12, 528/901; 524/588, 267, 860

[56] References Cited

U.S. PATENT DOCUMENTS

| | | | |
|---|---|---|---|
| 4,304,897 | 12/1981 | Bluestein | 528/20 |
| 4,532,315 | 7/1985 | Letoffe et al. | 524/14 |
| 4,604,444 | 8/1986 | Donnadieu et al. | 528/34 |
| 4,680,363 | 7/1987 | Beers | 524/18 |

FOREIGN PATENT DOCUMENTS 2041955 9/1980 United Kingdom .

*Primary Examiner*—Melvyn I. Marquis
*Attorney, Agent, or Firm*—Burns, Doane, Swecker & Mathis

[57] ABSTRACT

Organopolysiloxanes curable into elastomeric state, well adapted as sealing materials for a variety of substrates and useful, e.g., in the automotive industry, are comprised of a polyhydroxylated polysiloxane, a polyacyloxysilane crosslinking agent, and an effective amount of at least one calcium oxide, strontium oxide and/or barium oxide cure accelerator therefor. The subject compositions are stable for at least 10 minutes at ambient temperature and crosslink on heating and/or addition of an aqueous or liquid carboxylic acid promoter thereto.

11 Claims, No Drawings

ORGANOPOLYSILOXANES CONTAINING CURE ACCELERATORS

BACKGROUND OF THE INVENTION

1. Field of the Invention

The present invention relates to an organopolysiloxane composition curable into elastomeric state, even in a confined atmosphere, said composition comprising a crosslinking agent bearing acyloxy radicals bonded to silicon atoms, as well as an effective amount of at least one CaO, SrO and/or BaO cure accelerator.

2. Description of the Prior Art

Organopolysiloxane compositions of the aforementioned accelerated-cure type are known to this art, and are described, e.g., in French Patent No. 1,193,271, where the accelerator is zinc oxide, in British Patent No. 1,308,985, where the accelerator is a zeolite, and in European Patents Nos. EP-A-118,325 and EP-A-117,772, where the accelerator is selected, respectively, from an alkali and alkaline earth metal hydroxide, or from a mixture of water and an alkali or alkaline earth metal phosphate and/or polyphosphate.

In contrast to the single-component compositions containing acyloxy radicals but no accelerator (described, for example, in French Patent Nos. 1,198,749, 1,220,348 and 2,429,811 and European Patent No. EP-A-102,268), these accelerated-cure compositions are generally not stable in storage, but their crosslinking time is much shorter, for example, on the order of a few minutes to 60 minutes.

The accelerated-cure compositions, where this cure (or this crosslinking) is independent of the degree of humidity of the surrounding atmosphere, are employed in fields of application where this property is particularly advantageous, such as, for example, the production of "in situ" seals in the motor vehicle industry.

Furthermore, in single-component compositions including acyloxylated crosslinking agents, it is known, from U.S. Pat. No. 3,061,575, to add at least 1.5 mole of MgO per mole of organotriacyloxysilane to improve the heat stability of the crosslinked elastomer, especially if the latter is in a confined atmosphere.

For industrial applications involving continuous seal deposition, automatic apparatus is typically used for depositing a two-component diorganopolysiloxane composition, which includes a mixing head fitted with an application nozzle, the latter following the outline of the seals to be produced.

To prevent solidifying of the composition in the mixing head, which is maintained at ambient temperature when it is in use or during stoppages on a continuous seal application line, it would be desirable to have available an accelerated-cure composition having, on the one hand, very slow crosslinking at ambient temperature (longer than at least about 10 minutes) after the two components are mixed, namely, after mixing of the cure accelerator and, on the other hand, a very fast crosslinking of the seal after its formation.

It would also be desirable, furthermore, to have available a composition, the time of crosslinking of which at ambient temperature and under the influence of heat could be reduced or increased at will, enabling parameters other than temperature alone to be employed.

Complete control of the crosslinking time at ambient temperature would make it possible to shut down a continuous seal application line without the necessity fo purging the mixing head. A fairly slow cure at ambient temperature would also promote the production of suitable adhesion of the seal to the substrates, because the composition would spread easily over such substrates with a sufficiently long contact time to ensure suitable wetting of the surface, because the adhesion of the seals to the substrates is frequently an essential property of the seal.

It is also desirable to have available a composition which cures rapidly under the influence of a temperature rise which is as small as possible. In fact, a moderate rise in temperature would make it possible to maintain high production rates on industrial lines for continuous seal application.

Where the elastomer produced is concerned, a composition of this type should additionally have good mechanical properties, in particular when hot in a confined atmosphere in respect of the residual compression deformation (RCD).

Known accelerated-cure compositions do not possess adequate combination of the aforesaid desirable properties. In fact, accelerated-cure compositions containing zinc oxide and zeolites do not possess, in particular, mechanical properties which are satisfactory when hot in a confined atmosphere.

The compositions described in European Patent Nos. EP-A-118,325 and EP-A-117,772 have enabled a major step forward to be made in respect of the retention of mechanical properties, when hot, in a confined atmosphere, and have made it possible to employ compositions for the adhesive bonding or sealing of components travelling on industrial assembly lines, or for which there are no available storage areas which would ensure their complete cure. Nevertheless, these compositions may have a setting time at ambient temperature which is too short and their adhesion to substrates, especially metallic substrates, may be inadequate.

SUMMARY OF THE INVENTION

Accordingly, a major object of the present invention is the provision of improved accelerated-cure organopolysiloxane compositions which are characterized by the combination of the aforementioned desirable properties.

Briefly, this invention features organopolysiloxane compositions which are curable into elastomeric state and which comprise:

(A) 100 parts by weight of principally $\alpha,\omega$-di(hydroxy)diorganopolysiloxane polymers, having a viscosity of from 700 to 1,000,000 mPa.s at 25° C., each comprising a sequence of diorganosiloxy recurring units of the formula $R_2SiO$, in which the symbols R, which are identical or different, denote hydrocarbon radicals containing from 1 to 8 carbon atoms, whether unsubstituted or substituted by halogen atoms or cyano groups;

(B) 2 to 20 parts by weight of crosslinking agents of the general formula:

$$R_pSi(OCOR')_{4-p}$$

in which the symbol R is as defined under (A), the symbol R40 denotes a hydrocarbon radical devoid of aliphatic unsaturation, containing from 1 to 15 carbon atoms, and the symbol p denotes zero or one;

(C) 0 to 150 parts by weight of inorganic fillers; and (D) 0.1 to 15 parts by weight, per 100 parts by weight of (A)+(B)+(C), of at least one cure accelerator selected from among calcium oxide, strontium oxide and barium oxide.

DETAILED DESCRIPTION OF THE PREFERRED EMBODIMENTS OF THE INVENTION

More particularly according to the present invention, the polymers (A) having a viscosity of 700 to 1,000,000 mPa.s at 25 C., preferably 1,000 to 700,000 mPa.s at 25° C., are advantageously essentially linear polymers comprising diorganosiloxy recurring units of the aforesaid formula $R_2SiO$ and blocked by a hydroxyl group at each end of their polymer chain; however, the presence of monoorganosiloxy recurring units of the formula $RSiO_{1.5}$ and/or of siloxy recurring units of the formula $SiO_2$, is within the ambit of the invention, in a proportion not exceeding 2% based on the number of diorganosiloxy recurring units.

The hydrocarbon radicals containing from 1 to 8 carbon atoms, whether unsubstituted or substituted by halogen atoms or cyano groups, and denoted by the symbols R, are advantageously selected from among:

(i) alkyl and haloalkyl radicals containing from 1 to 8 carbon atoms, such as methyl, ethyl, n-propyl, isopropyl, n-butyl, n-pentyl, n-hexyl, 2-ethylhexyl, n-octyl, 3,3,3-trifluoropropyl, 4,4,4-trifluorobutyl and 4,4,4,3,3-pentafluorobutyl radicals;

(ii) cycloalkyl and halocycloalkyl radicals containing from 4 to 8 carbon atoms, such as cyclopentyl, cyclohexyl, methylcyclohexyl, 2,3-difluorocyclobutyl and 3,4-difluoro-5-methylcycloheptyl radicals;

(iii) alkenyl radicals containing from 2 to 4 carbon atoms, such as vinyl, allyl and 2-butenyl radicals;

(iv) aryl and haloaryl radicals containing from 6 to 8 carbon atoms, such as phenyl, tolyl, xylyl, chlorophenyl, dichlorophenyl and trichlorophenyl radicals; and (v) cyanoalkyl radicals in which the alkyl chains contain from 2 to 3 carbon atoms, such as β-cyanoethyl and γ-cyanopropyl radicals.

Exemplary of recurring units having the formula $R_2SiO$, representative are those of the formulae:

$(Ch_3)_2SiO$

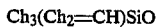
$Ch_3(Ch_2=CH)SiO$ $Ch_3(C_6H_5)SiO$ $(C_6H_5)_2SiO$ $CF_3Ch_2Ch_2(Ch_3)SiO$

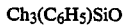
$NC\text{-}Ch_2Ch_2(Ch_3)SiO$

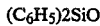
$NC\text{-}CH(Ch_3)Ch_2(Ch_2=CH)SiO$
$NC\text{-}Ch_2Ch_2Ch_2(C_6H_5)SiO$ It will be appreciated that, in one embodiment of the invention, it is possible to use as the polymers (A), copolymers or a mixture of α,ω-di(hydroxy)diorganopolysiloxane polymers which differ from each other in molecular weight and/or the nature of the groups bonded to the silicon atoms.

These α,ω-di(hydroxy)diorganopolysiloxane copolymers (A) are commercially available; in addition, they are easily produced.

The crosslinking agents (B) are advantageously used in a proportion of 2 to 20 parts by weight, preferably 3 to 15 parts by weight, per 100 parts by weight of the α,ω-di(hydroxy)diorganopolysiloxane polymers (A).

They correspond to the aforesaid formula

$R_pSi(OCOR')_{4-p}$ in which, as above indicated, the symbol R is as defined under (A), the symbol R' denotes a hydrocarbon raical devoid of aliphatic unsaturation containing from 1 to 15 carbon atoms and the symbol p denotes zero or 1.

Detailed information has been given above concerning the nature of the radicals denoted by the symbol radical selected from among:

(i) alkyl radicals containing from 1 to 15 carbon atoms, such as methyl, ethyl, n-propyl, n-butyl, n-pentyl, 1-ethylpentyl, n-hexyl, 2-ethylhexyl, n-octyl, neodecyl, n-decyl, n-dodecyl and n-pentadecyl radicals; (ii) cycloalkyl radicals containing from 5 to 6 ring carbon atoms, such as cyclopentyl and cyclohexyl radicals; and (iii) aryl radicals containing from 6 to 8 carbon atoms, such as phenyl, tolyl and xylyl radicals. Exemplary of the crosslinking agents (B), representative are those of the following formulae:

```
CH3Si(OCOCH3)3
C2H5Si—(OCOCH3)3
CH2=CHSi(OCOCH3)3
C6H5Si—(OCOCH3)3
CH3Si[OCOCH(C2H5)(CH2)3—CH3]3
CF3CH2CH2Si(OCOC6H5)3
CH3Si(OCOC6H5)3
```

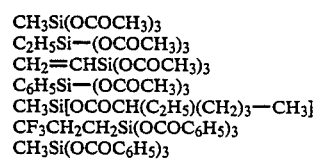
$$CH_3Si(OCOCH_3)_2(OCOCH\text{—}(CH_2)_3\text{—}CH_3) \atop | \atop C_2H_5$$

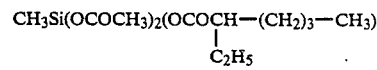

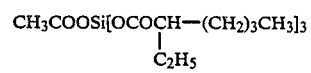
$$CH_3COOSi[OCOCH\text{—}(CH_2)_3CH_3]_3 \atop | \atop C_2H_5$$

It will be apparent that the constituents (A) and (B) of the compositions of the invention may be replaced with equivalent devolatilized materials originating from the stoichiometric reaction of (A) with (B) in accordance with the process described in French Patent No. 1,220,348.

The mineral or inorganic fillers (C) are advantageously employed in a proportion of 0 to 150 parts by weight, preferably 5 to 120 parts by weight, per 100 parts b weight of the α,ω-di(hydroxy)diorganopolysiloxane polymers (A). These fillers may be in the form of very finely divided materials, the mean particle diameters of which are less than 0.1 μm. These fillers include pyrogenic silicas and precipitation silicas; their specific surface area is generally greater than 40 m²/g and in most cases is in the range 150–200 m²/g.

These fillers may also be in the form of more coarsely divided materials, with a mean particle diameter greater than 0.1 μm. Exemplary of such fillers, representative are ground quartz, diatomaceous silicas, calcium carbonate, calcined clay, rutile-type titanium dioxide, iron, zinc, chromium, zirconium and magnesium oxides, various forms of alumina (hydrated or otherwise), boron nitride, lithopone and barium metaborate; their specific surface area is generally less than 30 m²/g.

The fillers (C) may ave been surface-modified by treatment with the various organosilicon compounds typically employed for such purpose. Thus, these organosilicon compounds may be organochlorosilanes, diorganocyclopolysiloxanes, hexaorganodisiloxanes, hexaorganodisilazanes or diorganocyclopolysilazanes (French Patent Nos. 1,126,884, 1,136,885 and 1,236,505 and British Patent No. 1,024,234). In the majority of cases, the treated fillers contain from 3 to 30% of their weight of organosilicon compounds.

The fillers (C) may comprise a mixture of several types of fillers of different particle size distribution; thus, for example, they may include 30 to 70% of finely divided silicas of specific surface area greater than 40 m$^2$/g and from 70 to 30% of more coarsely divided silicas with a specific surface area of less than 30 m$^2$/g.

Other than the constituents (A), (B), (C) and (D), the organopolysiloxane compositions according to the invention may contain curing catalysts which are typically selected from among:

(i) metal salts of carboxylic acids, preferably organotin salts of carboxylic acids, such as dibutyltin diacetate and dilaurate;

(ii) reaction products of organotin salts of carboxylic acids with titanium esters (U.S. Pat. No. 3,409,735);

(iii) tin chelates (European Patent No. EP-A-147,323); and (iv) organic titanium and zirconium derivatives, such as titanium and zirconium esters (U.S. Pat. No. 4,525,565).

These curing catalysts are typically employed in a proportion of 0.0004 to 6 parts by weight, preferably 0.008 to 5 parts by weight, per 100 parts by weight of $\alpha,\omega$-di(hydroxy)diorganopolysiloxane polymers (A).

The organopolysiloxane compositions may also contain the usual adjuvants and additives, including heat stabilizers in particular. These latter materials which, by their presence, improve the heat resistance of silicone elastomers, may include the rare-earth salts, oxides and hydroxides (and more especially the ceric oxides and hydroxides) or the titanium and iron oxides, preferably produced by combustion.

The compositions according to the invention advantageously contain from 0.1 to 15 parts by weight, and preferably from 0.15 to 12 parts by weight, of heat stabilizers per 100 parts by weight of $\alpha,\omega$-di(hydroxy)diorganopolysiloxane polymers (A).

Compounds which improve flame resistance are representative of other additives; they are preferably selected from among organic phosphorus derivatives, halogenated organic compounds, and organic and inorganic platinum derivatives.

Other than the principal constituents (A), (B), (C) and (D), and the aforementioned additives, individual organopolysiloxane compounds may be introduced with a view towards favorably affecting the physical characteristics of the compositions according to the invention and/or the mechanical properties of the elastomers produced by curing these compositions.

These organopolysiloxane compounds are well nown to this art; they include, more especially: (lf) $\alpha,\omega$-bis(triorganosiloxy)diorganopolysiloxane and/or $\alpha$-(hydroxy),$\omega$-(triorganosiloxy)diorganopolysiloxane polymers, having viscosities of at least 10 mPa.s at 25° C., consisting essentially of diorganosiloxy recurring units and not more than 1% of monoorganosiloxy and/or siloxy recurring units, the organic radicals bonded to the silicon atoms being methyl, vinyl and phenyl radicals, at least 60% of such organic radicals being methyl radicals and not more than 10% being vinyl radicals.

The viscosity of these polymers may be as high as several tens of millions of mPa.s at 25° C.; therefore, they include oils whose appearance ranges from fluid to viscous and resins ranging from soft to hard. They are prepared according to the usual methods, described more particularly in French Patent Nos. 978,058, 1,025,150, 1,108,764 and 1,370,884. $\alpha,\omega$-Bis(trimethylsiloxy)dimethylpolysiloxane oils having a viscosity ranging from 10 mPa.s to 1,000 mPa.s at 25° C. are preferably employed. These polymers, which act as plasticizers, may be added in a proportion not exceeding 150 parts by weight, preferably from 5 to 120 parts by weight, per 100 parts by weight of $\alpha,\omega$-di(hydroxy)diorganopolysiloxane polymers (A).

(2f) branched, liquid methylpolysiloxane polymers containing from 1.4 to 1.9 methyl radicals per silicon atom, comprising a combination of recurring units of the formulae:

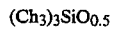

(Ch$_3$)$_3$SiO$_{0.5}$

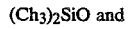

(Ch$_3$)$_2$SiO and

Ch$_3$SiO$_{1.5}$

They contain from 0.1 to 8% of hydroxyl groups. They may be prepared by hydrolysis of the corresponding chlorosilanes, as described in French Patent Nos. 1,408,662 and 2,429,811. Branched polymers are preferably used in which the recurring units are distributed in accordance with the following ratios:

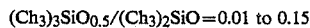

(Ch$_3$)$_3$SiO$_{0.5}$/(Ch$_3$)$_2$SiO=0.01 to 0.15 and

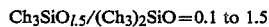

Ch$_3$SiO$_{1.5}$/(Ch$_3$)$_2$SiO=0.1 to 1.5

These polymers may be added in a proportion not exceeding 70 parts by weight, preferably from 3 to 50 parts by weight, per 100 parts by weight of $\alpha,\omega$-di(hydroxy)diorganopolysiloxane polymers (A). They confer thixotropic properties, particularly with the treated silicas.

(3f) diorganopolysiloxane oils blocked with hydroxyl and/or lower alkoxy groups containing from 1 to 4 carbon atoms, having a low viscosity generally in the range of 2 mPa.s to 40,000 mPa.s at 25° C. (when these oils are blocked only with hydroxyl groups, their viscosity is less than 700 mPa.s at 25° C.); the organic radicals bonded to the silicon atoms in these oils are, as before, methyl, vinyl and phenyl radicals, at least 40% of these radicals being methyl radicals and not more than 10% being vinyl radicals.

Methoxy, ethoxy, isopropoxy, n-propoxy, n-butoxy, isobutoxy and tert-butxxy groups are exemplary of the chainblocking lower alkoxy groups. The proportions of hydroxyl and/or alkoxy groups generally range from 0.5 to 20%. These oils are prepared according to the usual methods, described more particularly in French Patent Nos. 938,292, 1,104,674, 1,116,196, 1,278,281 and 1,276,619. $\alpha,\omega$-Dihydroxydimethylpolysiloxane oils are preferably used having a viscosity of 10 to 300 mPa.s at 25° C., as are $\alpha,\omega$-dihydroxymethylphenylpolysiloxane oils having a viscosity of 200 to 600 mPa.s at 25° C., and $\alpha,\omega$-dimethoxy(or diethoxy)dimethylpolysiloxane oils having a viscosity of 30 to 2,000 mPa.s at 25° C. They may be added in a proportion not exceeding 50 parts by weight, preferably from 2 to 40 parts by weight, per 100 parts by weight of α,ω-di(hydroxy)diorganopolysiloxane polymers (A). These oils permit the overall viscosity to be reduced and, according to customary usage, are considered to be "process aids" as well as the oils (2f).

(4f) hydroxylated organosilicon compounds having the general formula $$Z'SiZ_2(OSiZ_2)_wOH,$$

which are solid at ambient temperature. In this formula the symbols Z, which are identical or different, denote methyl, ethyl, n-propyl, vinyl or phenyl radicals; the symbol Z' denotes a hydroxyl radical or Z and the symbol w denotes zero, 1 or 2.

Exemplary of such compounds, representative are diphenylsilanediol, methylphenylsilanediol, dimethylphenylsilanol, 1,1,3,3-tetramethyldisiloxanediol, 1,3-dimethyl-1,3-diphenyldisiloxanediol and 1,1,5,5-tetramethyl-3,3-diphenyltrisiloxanediol. They may be added in a proportion not exceeding 30 parts by weight, preferably 0.5 to 20 parts by weight, per 100 parts by weight of α,ω-di(hydroxy)diorganopolysiloxane polymers (A). They confer thixotropant properties to the mixture which, in general, becomes slightly gelled due to their action.

The α,ω-bis(triorganosiloxy)diorganopolysiloxane and/or α-(hydroxy),ω-(triorganosiloxy)diorganopolysiloxane polymers described under (1f) may be completely or partially replaced with organic compounds which are inert with respect to the constituents (A), (B), (C) and (D) and which are miscible at least with the α,ω-di(hydroxy)diorganopolysiloxane polymers (A). Exemplary of such organic compounds, representative are the polyalkylbenzenes produced by alkylation of benzene using long-chain olefins, particularly olefins containing 12 carbon atoms, produced by the polymerization of propylene. Organic compounds of this type are described, for example, in French Patent Nos. 2,392,476 and 2,446,849.

If desired, the compositions according to the invention may be employed after dilution in liquid organic compounds; the diluents are preferably common commercial products, such as:

(i) halogenated or nonhalogenated aliphatic, alicyclic or aromatic hydrocarbons such as n-heptane, n-octane, cyclohexane, methylcyclohexane, toluene, xylene, mesitylene, cumene, tetralin, perchloroethylene, trichloroethane, tetrachloroethane, chlorobenzene and orthodichlorobenzene; benzene;

(ii) aliphatic and alicyclic ketones such as methyl ethyl ketone, methyl isobutyl ketone, cyclohexanone and idophorone;

(iii) esters such as ethyl acetate, butyl acetate and ethylglycol acetate.

The amount of diluent is typically quite small; it is generally less than 50%.

The alkaline earth oxides CaO, SrO and BaO are employed in a proportion of 0.1 to 15 parts by weight, preferably from 1 to 10 parts by weight, per 100 parts by weight of the total amount of the constituents (A), (B) and (C). They are employed in the form of a powder, the mean particle size of which is advantageously less than 500 μm, preferably less than 150 μm and greater than 1 μm.

Up to 80%, preferably up to 50% by weight of the accelerator (C) may be replaced with an alkaline earth hydroxide selected from among Ca(OH)$_2$, Mg(OH)$_2$, Sr(OH)$_2$ and Ba(OH)$_2$.

In accordance with this invention, it has been possible to demonstrate that the adhesion of the elastomer to various substrates, especially wood and aluminum, may be greatly improved by adding, per 100 parts by weight of the total amount of the constituents (A), (B) and (C), preferably from 0.1 to 10 parts by weight, and more preferably from 1 to 5 parts by weight, of at least one tackifier selected from among materials of the formula:

$$Y_nSi(OY')_{4-n}$$

in which Y is a saturated or unsaturated $C_1$–$C_{10}$ hydrocarbon radical and Y' denotes a $C_1$–$C_8$ alkyl radical and a $C_3$–$C_6$ alkoxyalkylene radical, n is 1 or 0 and $C_1$–$C_4$ alkyl polysilicates, in particular methyl polysilicate and ethyl polysilicate.

Mixtures of these tackifiers can also be employed, particularly the mixture of methyl silicate and methyl polysilicate.

The preferred tackifiers E are:

| | |
|---|---|
| CH$_2$=CHSi(OCH$_3$)$_3$ | vinyltrimethoxysilane |
| CH$_2$=CHSi(OCH$_2$CH$_2$OCH$_3$)$_3$ | vinyltris(methoxyethoxy)silane |
| Si(OCH$_3$)$_4$ | methyl silicate |
| Si(OCH$_2$CH$_2$OCH$_3$)$_4$ | tetra(methoxyethoxy)silane |
| | methyl polysilicate and ethyl polysilicate. |

The formulation of the compositions according to the invention may be carried out in a single stage, by stirring all of the constituents (A), (B), (C), (D) and, if desired, the above-mentioned additives and adjuvants, in a suitable reactor. These materials may be added to the reactor in any order; nevertheless, it is preferable to add the accelerators (D) after addition of the other compounds, such as to avoid a premature cure of the mass.

The formulation of the compositions may also be carried out in two stages. According to this embodiment of the present invention, single-component compositions are first prepared by mixing, in the absence of moisture, the constituents (A), (B), (C), if desired (E) and, if desired, the usual additives and adjuvants. They are stable in storage and cure only on being exposed to moist air.

In a second stage, the cure accelerators (D) are added to (and homogenized with) these single-component compositions, at the point in time of end use.

These compositions are stable at ambient temperature (25° C.) for at least 10 minutes in the absence of atmospheric moisture. On the other hand, these compositions cure very rapidly, that is to say, in less than approximately 3 minutes, when heated to a temperature of from 50° to 200° C., preferably from 80° to 150° C. and/or on the addition into the mixture, at ambient temperature and above, of a promoter (F) for the accelerator (D) selected from water or a liquid organic free carboxylic acid in which the hydrocarbon chain is preferably identical with that of the acyloxy radical R'OCO of the crosslinking agent (B), for example, acetic acid, or 2-ethylhexanoic acid.

The water or the acid should be injected in an amount representing at least 0.1 part per part of accelerator (D).

Below 0.1 part, the effect of the promoter (F) is inadequate.

The upper limit on the amount of promoter (F) has not been determined accurately; nevertheless, there is no point in exceeding 3 parts by weight of accelerator (D) because, by accelerating the cure of the compositions too abruptly, excess promoter could produce detrimental repercussions on the mechanical properties of the elastomers prodced. Moreover, such compositions, curing too quickly, would be almost impossible to employ.

The promoter (F) may, of course, be added in the form of a precursor which produces water and/or acid, for example, by reacting with certain constituents of the composition. The hydroxylated compounds (4f) above, for example, form such precursors on reacting with an excess of crosslinking agent (B).

Another object of the present invention features the use of the fast-cure compositions to produce seals.

The compositions according to the invention may be employed for many applications, such as sealing in the building industry, the assembly of a very wide variety of materials (metals, plastics, natural and synthetic rubbers, wood, cardboards, crockeryware, brick, ceramic, glass, stone, concrete, masonry components), the insulation of electrical conductors, coating of electronic circuits, and the production of molds used for the manufacture of articles made of synthetic resins or foams.

Furthermore, they are more especially suitable for the production of "in situ" seals employed in the motor vehicle industry. These "in situ" seals include several types, namely "squashed" seals, "shaped" seals and "injected" seals.

The "squashed" seals are formed as a result of the application of a pasty bead of the compositions to the area of contact between two metal components to be assembled. The pasty bead is first deposited on one of the components and then the other component is immediately applied to the first; as a result, the bead is squashed before it is converted to an elastomer. Seals of this type are intended for assemblies which are not to be regularly dismantled (oil sump seals, timing case seals, etc.).

"Shaped" seals are also obtained as a result of the application of a pasty bead of the compositions to the area of contact between two components to be assembled. However, after the pasty bead has been deposited on one of the components, a certain period of time elapses to permit the bead to cure completely into an elastomer, and only then is the second component applied to the first. As a result of this, such an assembly can be readily dismantled, because the component which is applied to that which has received the seal does not adhere to this seal. Furthermore, because of its rubbery nature, the seal adapts to all the irregularities of the surfaces to be joined together and, consequently, there is no need (1) to carefully machine the metal surfaces which are to be placed in contact with each other and (2) to clamp tightly the assemblies which are produced; these special characteristics make it possible to eliminate, to some extent, the gaskets, spacers and ribs which are usually intended to stiffen and reinforce the components of the assemblies.

Since the compositions according to the invention cure rapidly on being heated and/or on addition of the promoter (F), in a confined environment or in the open air, it follows that the "shaped" seals (and also the other "in situ" seals) resulting from the curing of these compositions may be produced under highly constraining conditions of industrial manufacture. For example, they may be manufactured on conventional assembly lines in the motor vehicle industry which are equipped with an automatic apparatus for depositing the compositions. This automatic apparatus frequently has a mixer head equipped with a heating system and an application nozzle, the latter being moved along the outline of the seals to be manufactured. The mixer head may receive the single-component polysiloxane composition and the accelerator, and it may also be provided with a third entry permitting the introduction of the promoter (F) described above.

The compositions produced and distributed by means of this apparatus must have a cure time which is properly adjusted in order, on the one hand, to avoid solidification in the mixer head and, on the other hand, to effect complete crosslinking when the deposition of the pasty bead on the components to be joined together is completed. These "shaped" seals are more especially suitable for sealing rocker covers, gearbox covers, timing spacers and even oil sumps, etc. In order to terminate the seal application, it is sufficient to discontinue heating the mixer head and/or the delivery of the promoter, after which at least 10 minutes are available at ambient temperature to purge the mixer head of the organopolysiloxane composition, if desired, before the latter solidifies if the line shutdown is longer than the time required for the composition to begin curing.

The injected seals are formed in a confined environment, in cavities which are frequently completely closed; the compositions placed in these cavities are quickly converted into elastomers whose properties are identical with those of elastomers produced by curing the compositions in open air. These seals can be used, for example, for sealing crankshaft bearings.

The compositions according to the invention are also suitable for the manufacture of quick-curing seals in applications other than in the motor vehicle industry. Thus, they can be used to bond and to seal plastic electrical housings, and to produce seals for vacuum cleaners and for steam irons.

The elastomers produced by curing the compositions according to the invention have mechanical properties which are identical to those of the elastomers produced from known single-component compositions, and thus produced by merely mixing the constituents (A), (B), (C) and, if desired, conventional additives, without the addition of the accelerators (D). In particular, the residual compression deformations are relatively low, on the order, for example, of 8 to 35%; furthermore, complete crosslinking, measured as the Shore A hardness after heating and/or addition of the promoter (F), is effected immediately following elapse of the crosslinking times referred to above, which usually range from a few minutes to 60 minutes, sometimes longer, but never more than 3 hours. In the case of the single-component compositions, at least about 10 hours are required for complete crosslinking under the most favorable conditions. Moreover, mere addition of water to the single-component compositions, while appreciably accelerating the curing process, does not permit them to crosslink properly; in general, the final Shore A hardness is from 15 to 40% less than that which results with the accelerator D.

In order to further illustrate the present invention and the advantages thereof, the following specific examples are given, it being understood that same are intended only as illustrative and in nowise limitative. In said examples to follow, all parts and percentages are given by weight, unless otherwise indicated.

EXAMPLE 1

A composition which cures into an elastomer in the presence of atmospheric moisture at ambient temperature and above was prepared by admixing the following constituents:

178 g: $\alpha,\omega$-dihydroxypolydimethylsiloxane oil having a viscosity of 20,000 mPa.s at 25° C.;

534 g: $\alpha,\omega$-dihydroxypolydimethylsiloxane oil having a viscosity of 3,500 mPa.s at 25° C.;

93 g: pyrogenic silica having a BET specific surface area of 300 m$^2$/g, surface-treated with octamethylcyclotetrasiloxane;

170 g: ground quartz having a mean particle diameter of 5 μm;

25 g: methyltriacetoxysilane.

This composition was fluid and stable in a closed dry environment. However, when 29 g of air-classified ground quicklime having a particle size of 75 μm or below were added to 1,000 g of this composition, and when this composition was then deposited in closed tubes placed in enclosures which were thermostated at different temperatures, it was observed that the time, upon completion of which the composition could no longer be extruded, varied in the following manner which is reported in Table I below:

TABLE I

| Temperature of the thermostated enclosure | Time after which the composition was no longer capable of being extruded |
| --- | --- |
| 22° C. | 60 minutes |
| 25° C. | 40 minutes |
| 36.5° C. | 20 minutes |
| 45° C. | 12 minutes |
| 50° C. | 5 minutes |

It will thus be seen that the temperature increase rapidly produced a decrease in the cure time in a closed environment.

EXAMPLE 2

In order to assess the time after which an organopolysiloxane composition began to cure, the composition was introduced, in the absence of atmospheric moisture, into a Brabende ® model PL3S Plastograph fitted with a model N50H cam mixer and a recorder of the value of the resistance torque.

This composition was produced by mixing a composition H1 produced by mixing:

100 parts of an $\alpha,\omega$-di(hydroxy)polydimethylsiloxane having a viscosity of 4,000 mPa.s at 25° C.;

20 parts of a pyrogenic silica having a BET specific surface area of 200 m$^2$/g;

20 parts of ground quartz having a mean particle diameter of 5 μm;

20 parts of rutile-type titanium dioxide having a mean particle diameter of 8 μm;

1 part of an $\alpha,\omega$-di(hydroxy)methylphenylpolysiloxane oil having a viscosity of 350 mPa.s at 25° C.; and 6 parts of methyl(triacetoxy)silane.

This composition H1 was in the form of a non-flowing dough, the consistency of which did not change in the absence of moisture. The temperature of the dough was controlled by virtue of the presence of a thermostat bath; the torque-measuring scale was set at zero and 10 parts of an additive of the following composition were added to 100 parts of composition H1:

67 parts of $\alpha,\omega$-trimethylsiloxypolydimethylsiloxane polymer having a viscosity of 30,000 mPa.s;

28 parts of air-classified ground quicklime CaO of Example 1 or of Ca(OH)$_2$;

1 part of iron oxide; and 4 parts of pyrogenic silica having a BET surface area of 150 m$^2$/g.

The accelerated composition H2 was produced in this The temperature $\theta$ of the composition was measured at the time of addition of the additive, together with the time t after which a sudden rise in the driving torque was noted, namely, the beginning of cure of the composition. The results obtained are reported in Table II below:

TABLE II

| | t | |
| --- | --- | --- |
| | with CaO | with Ca(OH)$_2$ |
| 25° C. | 50 minutes | 8 minutes |
| 30° C. | 40 minutes | 7 minutes |
| 48° C. | 10 minutes | 1 minute |
| 75° C. | 2 minutes | crosslinks |

From Table II it will be seen that the use of CaO at 20°–30° C. results in longer crosslinking times than for Ca(OH)$_2$ and that a moderate increase in temperature enabled shorter cure times to be once again obtained.

EXAMPLE 3

The procedure of Example 2 was repeated, except that the operation was carried out at 20° C. and that specific quantities of acetic acid q, given in parts per part of accelerator (CaO), were added to the CaO-accelerated composition H2, and the time t (min), after which a sudden rise in the torque was noted, was measured. The results are reported in Table III below:

TABLE III

| q | t |
| --- | --- |
| 0 | 85 |
| 0.3 | 35 |
| 1 | 5 |

From Table III it will be seen that the rate of cure at ambient temperature can be regulated according to the quantities q of free acid which were added.

EXAMPLE 4

The composition H2 of Example 2, accelerated with calcium oxide, was employed and increasing quantities of methyl polysilicate were added, which are given in parts by weight per 100 parts of H2 in Table IV below. Test specimens were then produced and used to measure the breaking strength (BS in MPa) and the elongation at break, by following the ASA standard 116-1-1960; after curing at two separate temperatures $\theta$ at 25° C. for 24 hours and at 60° C. for 30 minutes. The results obtained on degreased and abraded ordinary aluminum are reported in Table IV below:

TABLE IV

| p (in parts) | (°C.) | BS MPa | EB % | Break type |
| --- | --- | --- | --- | --- |
| 0 | 25° C. | 0.30 | 30 | adhesive |
| 0.5 | 25° C. | 0.56 | 44 | adhesive |
| 0.5 | 60° C. | 0.60 | 44 | adhesive |
| 1 | 25° C. | 0.68 | 68 | adhesive |
| 1 | 60° C. | 0.90 | 60 | adhesive |

TABLE IV-continued

| P (in parts) | (°C.) | BS MPa | EB % | Break type |
|---|---|---|---|---|
| 2 | 25° C. | 1.20 | 104 | cohesive |
| 2 | 60° C. | 1.10 | 90 | cohesive |

From Table IV it will be seen that increasing quantities of methyl polysilicate enabled the adhesion level produced to be improved and that small quantities of methyl polysilicate enabled a satisfactory adhesion level to be produced on aluminum.

EXAMPLE 5

10 parts of the following base doughs containing various tackifiers (E) were added to 100 parts of the composition $H_1$ of Example 1:
56 parts of α,ω-(trimethylsiloxy)polydimethylsiloxane polymer having a viscosity of 30,000 mPa.s at 25° C.;
28 parts of the powdered calcium oxide of Example 2;
5 parts of pyrogenic silica having a BET specific surface area of 150 m²/g;
1 part of powdered iron oxide; and
10 parts of (E).

The adhesion of the elastomers produced to ordinary degreased aluminum was assessed according to ASA standard 116-1-1960.

The results obtained are reported in Table V below:

TABLE V

| Tackifier | BS MPa | EB % | Break type |
|---|---|---|---|
| None | 0.30 | 30 | adhesive |
| $Si(OnC_3H_7)_4$ | 0.48 | 40 | adhesive |
| $CH_3Si(OCH_3)_3$ | 0.36 | 36 | adhesive |
| $CH_2=CHSi(OCH_3)_3$ | 0.62 | 50 | adhesive |
| $CH_2=CHSi(OCH_2CH_2OCH_3)_3$ | 0.45 | 48 | adhesive |
| $Si(OCH_3)_4$ | 1.25 | 90 | cohesive |
| $Si(OCH_2CH_2CH_2OCH_3)_4$ | 1.24 | 88 | cohesive |
| Methyl polysilicate | 1.24 | 92 | cohesive |

EXAMPLE 6

Composition $I_1$, stable in storage in the absence of moisture, was produced by mixing:
100 parts of α,ω-dihydroxypolydimethylsiloxane polymer having a viscosity of 3,500 mPa.s at 25° C.;
10 parts of methyltris(2-ethylhexanoyloxy)silane; and
7 parts of pyrogenic silica having a BET surface area of 150 m²/g.

10 parts of the base dough $I_2$, were produced by mixing, in the absence of moisture:
56 parts of α,ω-trimethylsiloxypolydimethylsiloxane polymer having a viscosity of 30,000 mPa.s at 25° C.;
28 parts of the calcium oxide of Example 2;
1 part of iron oxide; and
10 parts of methyl silicate $Si(OCH_3)_4$, per 100 parts of composition $I_1$, were added into the Plastograph of Example 2.

A composition $I_3$ was thus obtained and used to measure the increase in the resistance torque at 22° C. after minutes, according to the method set forth in Example 2.

Test specimens were made using composition $I_3$ to evaluate adhesion to degreased aluminum and steel according to ASA standard 116-1-1960.

After curing for 30 minutes at 60° C., the following results, reported in Table VI below, were obtained:

TABLE VI

| Substrate | BS MPa | EB % |
|---|---|---|
| Steel | 0.46 | 65 |
| Aluminum | 0.40 | 59 |

Composition $I_1$ was then employed by itself or with of additive $I_2$ to produce beads which were deposited onto a steel plate and films, 2 mm in thickness, on a substrate treated with a release agent (fluoropolymer) to render it nonadhesive.

After 8 days at normal temperature, beads of composition $I_1$ which were deposited onto the steel plate showed visible corrosion (rusty appearance) at the edges of the bead in contact with the metal; on the other hand, when composition $I_3$ was employed, there was no visible corrosion and the adhesion was maintained.

The 2-mm thick films were peeled off after 7 days and permitted to swell in toluene. A determination of 2-ethylhexanoic acid released during the crosslinking of composition $I_1$ showed that the toluene had extracted 38 millimoles of acid per 100 g of elastomer. When the elastomer had been prepared from composition $I_3$, the toluene no longer contained any measurable acid.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An organopolysiloxane composition of matter curable into elastomeric state, comprising a polyhydroxylated polysiloxane, a polyacyloxysilane crosslinking agent, and an effective amount of a cure accelerator comprising at least one of calcium oxide, strontium oxide or barium oxide.

2. The organopolysiloxane composition as defined by claim 1, comprising:
(A) 100 parts of α,ω-di(hydroxy)diorganopolysiloxane polymers having a viscosity of 700 to 1,000,000 mPa.s at 25° C., which comprise a sequence of diorganosiloxy recurring units of the formula $R_2SiO$ in which the symbols R, which are identical or different, denote hydrocarbon radicals containing from 1 to 8 carbon atoms, or substituted such hydrocarbon radicals bearing at least one halogen atom or cyano group substituent;
(B) 2 to 20 parts of a crosslinking agent of the general formula:

$$R_pSi(OCOR')_{4-p}$$

in which the symbol R is as defined under (A), the symbol R' denotes a hydrocarbon radical devoid of aliphatic unsaturation and containing from 1 to 15 carbon atoms, and the symbol p denotes zero or one;
(C) 0 to 150 parts of inorganic filler material; and
(D) 0.1 to 15 parts, per 100 parts of the total amount of (A)+(B)+(C), of a cure accelerator comprising at least one of calcium oxide, strontium oxide or barium oxide.

3. The organopolysiloxane composition as defined by claim 2, wherein 80% by weight of said cure accelerator (D) comprises at least one of $Ca(OH)_2$, $Mg(OH)_2$, $Sr(OH)_2$ or $Ba(OH)_2$.

4. The organopolysiloxane composition as defined by claim 2, wherein the radicals R in said diorganopolysiloxane (A) comprises:
 (i) alkyl and haloalkyl radicals containing from 1 to 8 carbon atoms;
 (ii) cycloalkyl and halocycloalkyl radicals containing from 4 to 8 carbon atoms; (iii) alkenyl radicals containing from 2 to 4 carbon atoms;
 (iv) aryl and haloaryl radicals containing from 6 to 8 carbon atoms; or
 (v) cyanolkyl radicals, the alkyl moiety of which contains from 2 to 3 cabon atoms, or mixtures thereof.

5. The organopolysiloxane composition as defined by claim 4, wherein the the polyacyloxysilane (B) has the formula $R_pSi(OCOR')_{4-p}$ in which the symbol p denotes 0 or 1, and the symbol R' comprises:
 (i) alkyl radicals containing from 1 to 15 carbon
 (ii) cycloalkyl radicals containing from 5 to 6 ring carbon atoms; or
 (iii) aryl radicals containing from 6 to 8 carbon atoms, or mixtures thereof.

6. The organopolysiloxane composition as defined by claim 1, further comprising a curing catalyst.

7. The organopolysiloxane compositon as defined by claim 2, further comprising, per 100 parts of the total amount of (A), (B) and (C), 0.1 to 10 parts of at least one tackifier (E) having the formula:

$$Y_nSi(OY')_{4-n}$$

in which Y is a saturated or unsaturated $C_1-C_{10}$ hydrocarbon radical and Y' is a $C_1-C_8$ alkyl radical or a $C_3-C_6$ alkoxy-alkylene radical and n is 1 or 0, or a $C_1-C_4$ alkyl polysilicate.

8. The organopolysiloxane composition as defined by claim 7, wherein said tackifier (E) comprises methyl silicate, or tetra(methoxyethoxy)silane, methyl polysilicate, and mixtures thereof.

9. The organopolysiloxane composition as defined by claim 1, further comprising a plasticizer therefor.

10. A process for curing the organopolysiloxane composition as defined by claim 1, comprising adding thereto, at ambient temperature, an effective amount of water or liquid carboxylic acid promoter (F).

11. An organopolysiloxane composition of matter curable into elastomeric state, comprising:
 (A) 100 parts of α, ω-di(hydroxy)diorganopolysiloxane polymers having a viscoisty of 700 to 1,000,000 mPa.s at 25° C., which comprise a sequence of diorganosiloxy recurring units of the formual $R_2SiO$ in which the symbols R, which are identical or different, denote hydrocarbon radicals containing from 1 to 8 carbon atoms, or substituted such hydrocarbon radicals bearing at least one halogen atom or cyano group substituent;
 (B) 2 to 20 parts of a crosslinking agent of the general formula:

$$R_pSi(OCOR')_{4-p}$$

in which the symbol R is as defined under (A), the symbol R' denotes a hydrocarbon radical devoid of aliphatic unsaturation and containing from 1 to 15 carbon atoms, and the symbol p denotes zero or one, wherein said constituents (A) and (B) comprise the devolatilized reaction product emanating from the stoichiometric reaction of (A) and (B);
 (C) 0 to 150 parts of inorganic filler material; and
 (D) 0.1 to 15 parts, per 100 parts of the total amount of (A)+(B)+(C), of at least one cure accelerator comprising calcium oxide, strontium oxide or barium oxide, or mixtures thereof.

* * * * *